Dec. 23, 1941.  D. HEYER  2,267,029
VEHICLE HYDRAULIC BRAKE
Filed April 29, 1940
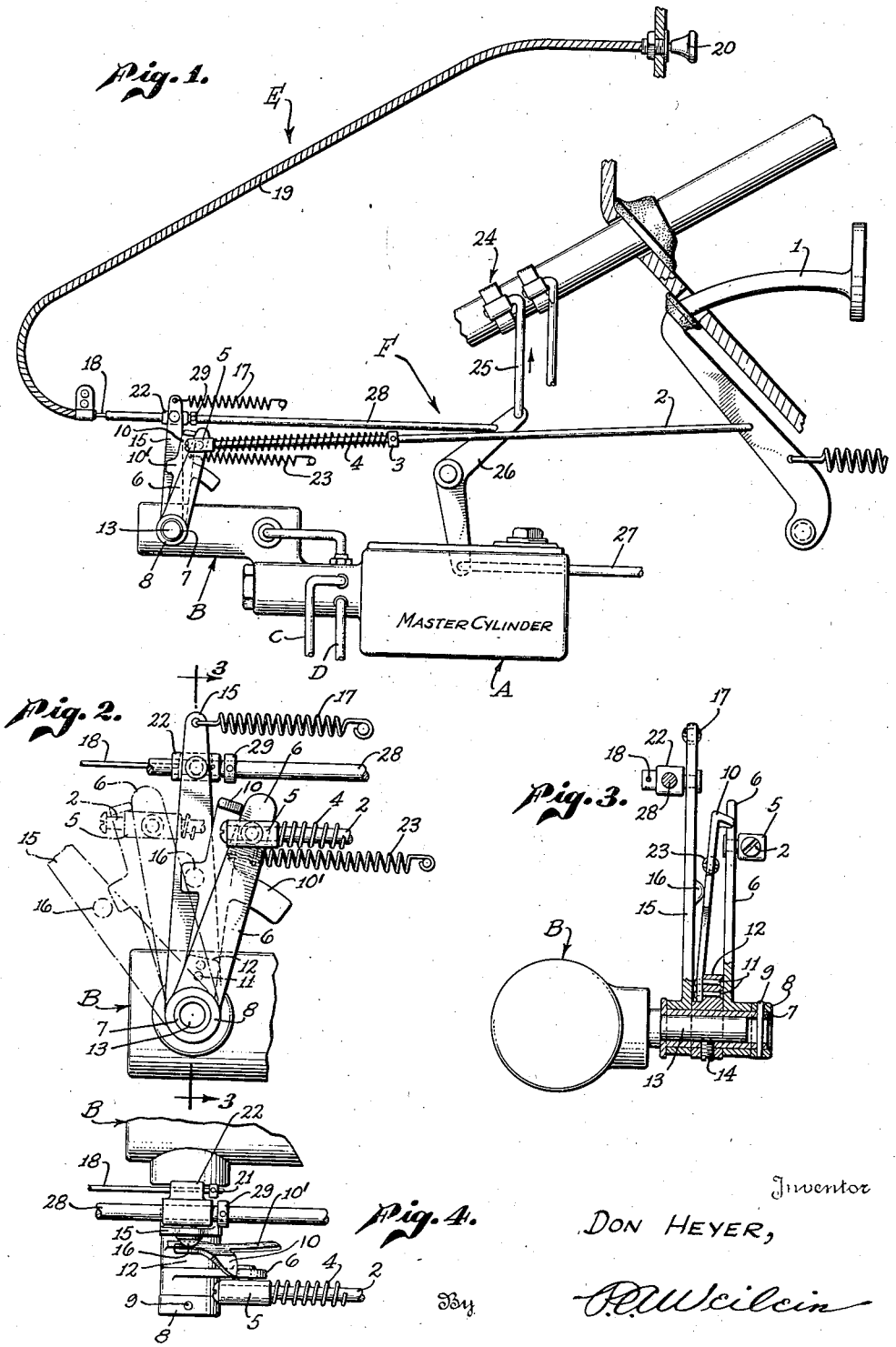
Inventor
DON HEYER,
By
Attorney Patented Dec. 23, 1941

2,267,029

UNITED STATES PATENT OFFICE 2,267,029

VEHICLE HYDRAULIC BRAKE

Don Heyer, Los Angeles, Calif.

Application April 29, 1940, Serial No. 332,206

6 Claims. (Cl. 192—4)

This invention relates to motor vehicle hydraulic brakes; and has special reference to valve mechanisms used in conjunction with hydraulic brake systems for preventing the motor vehicle from rolling backward on upgrades when the said vehicle is stopped and the clutch is released.

A motor vehicle equipped with a valve mechanism of this nature operates as follows:

The operator depresses the clutch pedal which is mechanically connected to the valve mechanism, and depresses the brake pedal. The brake pedal may be immediately released and the brakes will remain on as long as the clutch pedal is held down.

The motor vehicle will be prevented from rolling backward due to the fact that the valve mechanism prevents the hydraulic fluid from escaping from the brake cylinders and returning to the master cylinder. When the operator engages the clutch the brakes are released and the load is picked up, allowing the operator to use his right foot on the accelerator. This greatly simplifies driving where it is necessary to stop on upgrades.

There are times, however, when this valve device works to the disadvantage of the operator, as an example, when parking or backing up the motor vehicle in reverse gear.

The valve device does not release the brakes until the clutch is engaged and therefore the clutch cannot be "slipped" or applied gently. This is especially annoying when parking in a limited area and it is necessary to alternately engage and disengage the clutch and brakes.

The fact that the brakes are not released until the clutch is engaged causes increased fuel consumption and wear on the brakes.

An object of the invention is to provide means for rendering the valve device inoperative by means of a manual control and automatically when the motor vehicle is in reverse gear. The operator may disconnect the valve device while driving on level roads and instantly engage the valve device when it is necessary to stop on an upgrade. When the operator shifts to reverse gear the valve device is automatically disconnected by means of a mechanical lever system operated by the reverse shifting mechanism.

Other objects and advantages and useful applications for the invention will be made apparent by the following description, reference being made to the annexed drawing in which—

Figure 1 is a side elevation of the invention installed and connected with a conventional hydraulic brake system and valve device operated by the clutch pedal.

Figure 2 is an end view of the lever assembly mounted on the valve device shaft and shows the position of the levers when the manual and automatic controls are in the operative position; the dotted view shows the position of the levers when the clutch pedal has been depressed and at the instant the manual or automatic control has been operated to render the valve device inoperative.

Figure 3 is a view of the lever assembly in operative position, partly in section, showing the relationship of the various parts and the method of securing to the valve device shaft.

Figure 4 is a top view of the lever assembly showing the mechanism in operative position.

Referring to Figure 1, a master cylinder A used in conjunction with conventional hydraulic brake systems for motor vehicles has attached thereto a well known valve device B used to prevent the vehicle from rolling backwards on upgrades while the clutch is disengaged. The pipes C and D connect with cylinders on the vehicle axles to operate the brakes in a well known manner.

When the clutch pedal 1 is depressed to disengage the clutch, it operates a rod 2 on which is affixed a collar 3. The collar 3 engages a spring 4 which in turn engages a guide bearing 5. The bearing 5 is pivotally attached to a lever 6 which is journaled on a sleeve 7. A collar 8 is secured to the sleeve 7 by pin 9 to maintain the lever 6 in the proper axial position. The lever 6 is free to rotate about the axis of sleeve 7 and is not in fixed operating relation therewith.

A lever 10 which is made of a spring material is affixed by rivets 11 to a hub 12 which is secured to the sleeve 7 and the shaft 13 by a set screw 14. This lever 10 is formed with an arcuate wing 10' for a purpose which will presently appear.

The shaft 13 projects from the valve device B and operates the valve mechanism therein. A lever 15 is also journaled on the sleeve 7 and is free to rotate about the axis thereof. A projection 16 on lever 15 engages the wing 10' of lever 10 maintaining the formed outer end of lever 10 in contact with lever 6 while the lever 15 is held in normal operating position by spring 17. The wing 10' is of sufficient length so that when lever 15 is in the position shown in Fig. 2 in full lines, the projection 16 always engages the wing 10' during the entire movement of lever 10. As indicated by the dotted lines in Figure 2, however, lever 15 may be moved forwardly, by a mechanism to be explained, to such a position that it is out of engagement with the wing 10' of the lever 10. With the lever 15 in the position shown in full lines in Figure 2 it will be readily seen that if the vehicle is stopped on an upgrade and the brakes applied and the clutch pedal 1 is depressed disengaging the clutch, the rod 2 will operate the lever 6 and therefore the shaft 13 through the connecting mechanism. This results in closing the valve ports in the valve device B, and the hydraulic fluid cannot escape from the brake cylinders back to the master cylinder A. Therefore, the brakes remain on until the clutch pedal 1 is released and the clutch is engaged.

The present invention may be used in conjunction with the valve device B to render it inoperative for reasons set forth herein, by means of the manual control E or the automatic control F operated by means of the reverse gear shifting mechanism.

The manual control E consists of a flexible wire 18 within a flexible casing 19, and has a suitable knob 20 affixed to one end of the wire 18 and a small collar 21 affixed to the other end of same.

To render the valve device B inoperative, the knob 20 is pulled out, the collar 21 engages the guide bearing 22 and moves the lever 15 to the left, as shown in the dotted position of Figure 2. Lever 10 is made of a spring material and is tensioned to move away from lever 6 but is normally held engaged therewith by the projection 16 on lever 15. When the lever 15 is operated as above described, the projection 16 moves off of the wing of lever 10. The spring 23 returns and maintains the lever 10 in the inoperative position, and the lever 6 is free to move through its operating arc without affecting the valve device B.

When it is desired to use the valve device B, the knob 20 is pushed in and the spring 17 returns the lever 15 to the normal operating position. The projection 16 engages the wing 10' of lever 10, springing it over so the formed end thereon engages the lever 6. If the clutch pedal 1 is in the depressed position when the manual control E is operated to engage the valve device B, the said clutch pedal 1 must be released and again depressed to pick up the lever 10 and thereby render the device operative.

The automatic control F is operated by the reverse shifting mechanism 24 which operates the rod 25, the bell crank 26 and the rod 27 which connects with the transmission of the vehicle. A rod 28 is operated by the bell crank 26 when the reverse gear mechanism is shifted to "reverse." The rod 28 has a collar 29 affixed thereon which engages the guide bearing 22. The lever 15 operates to allow the lever 10 to disengage the lever 6 rendering the valve device B inoperative in the same manner as the manual control. When the shifting mechanism is returned to neutral position or any other position except reverse, the spring 17 maintains the lever 15 in normal operating position allowing the valve device B to function.

This invention attains its objects and purposes, and may be varied otherwise than as herein particularly specifically disclosed. I contemplate such variations as may be made within the scope of equivalent limits as defined by the appended claims.

I claim:

1. In a motor vehicle having a clutch, a hydraulic brake mechanism including a valve for preventing release of the brakes of the vehicle, a pedal for operating the clutch, a shaft for operating said valve, a lever secured to said shaft for rotation therewith, a second lever mounted for rotation in response to movement of the clutch pedal, and manual control means causing operative engagement of said levers with each other to cause movement of said first lever in response to movement of the clutch pedal, thereby operating said valve.

2. In a motor vehicle having a clutch, a hydraulic brake mechanism including a valve for preventing release of the brakes of the vehicle, a pedal for operating the clutch, a shaft for operating said valve, a lever secured to said shaft for rotation therewith, a second lever mounted for rotation in response to movement of the clutch pedal, means causing operative engagement of said levers with each other to cause movement of said first lever in response to movement of the clutch pedal, thereby operating said valve, and an operative connection between the reverse shifting mechanism of the vehicle and the last mentioned means preventing such engagement when said shifting mechanism is in reverse position.

3. In a motor vehicle having a clutch, a hydraulic brake mechanism, including a valve for preventing release of the brakes of said vehicle, a pedal for operating the clutch, a shaft for operating said valve, a lever secured to said shaft for rotation therewith, a second lever mounted for rotation in response to movement of the clutch pedal, means causing operative engagement of said levers with each other to cause movement of said first lever in response to movement of the clutch pedal, thereby operating said valve, a manual control for the last mentioned means, and an operative connection between the reverse shifting mechanism of the vehicle and said last mentioned means, said manual control and said operative connection both being capable of preventing operation of said means independently of each other.

4. In a motor vehicle having a clutch and a pedal for the operation thereof, hydraulic brake mechanism including a valve for preventing release of the brakes of said vehicle, a shaft for operating said valve, a lever mounted on said shaft for rotation thereon, means operatively connecting said lever to the clutch pedal of the motor vehicle for rotation in response to movement thereof, a second lever secured to said shaft for rotation therewith, a third lever mounted on said shaft for rotation thereon, control means for governing the position of said third lever, and means on said third lever for causing operative engagement of said first and second levers upon movement of said control means to one position, whereby movement of said clutch pedal causes operation of said valve.

5. In a motor vehicle having a clutch and a pedal for the operation thereof, hydraulic brake mechanism including a valve for preventing release of the brakes of said vehicle, a shaft for operating said valve, a lever mounted on said shaft for rotation thereon, means operatively connecting said lever to the clutch pedal of the motor vehicle for rotation in response to movement thereof, a second lever secured to said shaft for rotation therewith, a third lever mounted on said shaft for rotation thereon, control means for governing the position of said third lever, and a projection on said third lever moving a portion of the second lever into the path of movement of the first lever upon movement of said control means to one position, thereby causing operative engagement of the first and second levers.

6. In a motor vehicle having a clutch and a pedal for the operation thereof, hydraulic brake mechanism including a valve for preventing release of the brakes of said vehicle, a shaft for operating said valve, a lever mounted on said shaft for rotation thereon, means operatively connecting said lever to the clutch pedal of the motor vehicle for rotation in response to movement thereof, a second lever of spring material secured to said shaft for rotation therewith, a third lever mounted on said shaft for rotation thereon, control means for governing the position of said third lever, and a projection on said third lever bending said second lever to a position in which a portion of said second lever is in the path of movement of the first lever upon movement of said control means to one position, said second lever normally being out of the path of movement of the first lever.

DON HEYER.